(12) United States Patent
Suzuki

(10) Patent No.: US 8,019,951 B2
(45) Date of Patent: Sep. 13, 2011

(54) MEMORY CONTROLLER INCLUDING MULTIPLE SYSTEM BUS INTERFACES

(75) Inventor: Takeshi Suzuki, Tachikawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 398 days.

(21) Appl. No.: 12/304,749

(22) PCT Filed: Jun. 28, 2007

(86) PCT No.: PCT/JP2007/063041
§ 371 (c)(1),
(2), (4) Date: Dec. 12, 2008

(87) PCT Pub. No.: WO2008/010397
PCT Pub. Date: Jan. 24, 2008

(65) Prior Publication Data
US 2009/0138665 A1    May 28, 2009

(30) Foreign Application Priority Data
Jul. 21, 2006    (JP) .................................. 2006-199943

(51) Int. Cl.
*G06F 12/00* (2006.01)
(52) U.S. Cl. ........ 711/154; 711/147; 711/149; 711/150; 711/151; 711/158
(58) Field of Classification Search .................. None
See application file for complete search history.

(56) References Cited

U.S. PATENT DOCUMENTS
6,286,070 B1    9/2001    Ohara
7,174,399 B2 *  2/2007    Yamamoto ..................... 710/74
2002/0174292 A1  11/2002  Morita et al.
2006/0140036 A1   6/2006  Yamamoto
2008/0056017 A1   3/2008  Suzuki et al.

FOREIGN PATENT DOCUMENTS

| EP | 0999503 A2 | 10/2000 |
|----|------------|---------|
| JP | 11-120154 A | 4/1999 |
| JP | 2000-47974 A | 2/2000 |
| JP | 2000-148576 A | 5/2000 |
| JP | 2002-342159 A | 11/2002 |
| JP | 2005-316546 A | 11/2005 |
| JP | 2006-99895 A | 4/2006 |
| JP | 2006-184792 A1 | 7/2006 |

OTHER PUBLICATIONS

Translation of International Preliminary Report on Patentability and Written Opinion in corresponding International Application No. JP2007/063041 (Feb. 2009).
PCT International Search Report and Written Opinion of the International Searching Authority (Oct. 2007).

* cited by examiner

*Primary Examiner* — Shawn X Gu
(74) *Attorney, Agent, or Firm* — Fitzpatrick, Cella, Harper & Scinto

(57) ABSTRACT

A memory controller is provided for dealing with change in the form of use or operation state of a system. The memory controller includes bus interfaces, a memory controller core unit, and a memory interface. The memory controller core unit has a command controller. The bus interface units and command controller exchange commands via a bus.

8 Claims, 9 Drawing Sheets

MEMORY CONTROLLER INCLUDING MULTIPLE SYSTEM BUS INTERFACES

TECHNICAL FIELD

The present invention relates to a memory controller for controlling a memory that can be shared by a plurality of buses.

BACKGROUND ART

Conventionally, a system LSI in which a plurality of bus masters and a shared memory are connected by a plurality of system buses has been implemented (e.g., patent reference 1). A processor, DSP (Digital Signal Processor), DMAC (Direct Memory Access Controller), and the like are known as the bus masters. In a system LSI of this kind, a memory controller for controlling access from a plurality of system buses to a shared memory is an essential device.

This memory controller is required to achieve high system performance while maintaining high versatility to various systems different in system bus configuration, memory configuration, and the like. For this purpose, it is important for the memory controller to control access while ensuring the band width and real-time processing of the shared memory.

The conventional memory controller can be connected to only a specific system bus formed in common to various systems, or the priority of connection of each system bus is fixed.

Patent reference 1: Japanese Patent Laid-Open No. 11-120154

DISCLOSURE OF INVENTION

Problems that the Invention is to Solve

Accordingly, the prior art is inconvenient because the memory controller must be redesigned when constructing systems having different system configurations, or when the form of use of a system is changed.

The present invention has been made in consideration of the above situation, and has as its object to provide a memory controller capable of flexibly dealing with the change in form of use or operation state of a system.

Means of Solving the Problems

To achieve the above object, the present invention provides a memory controller which controls a memory configured to be shared by a plurality of buses, comprising a plurality of bus interface units, a memory controller core unit, and a memory interface unit, wherein the plurality of bus interface units receive commands from the plurality of buses, and convert the commands into commands receivable by the memory controller core unit, the memory controller core unit includes a command controller which issues a received command to the memory interface unit, the memory interface unit converts the command received from the memory controller core unit into a command corresponding to a memory, and the memory controller further comprises a bus which exchanges commands between the bus interface unit and the command controller.

Effects of the Invention

The present invention can provide a memory controller capable of flexibly dealing with the change in the form of use or operation state of a system.

Other features and advantages of the present invention will be apparent from the following explanation taken in conjunction with the accompanying drawings. Note that in the accompanying drawings, the same reference numerals denote the same or similar parts.

BRIEF DESCRIPTION OF DRAWINGS

The accompanying drawings, which are incorporated in and constitute a part of the specification, illustrate embodiments of the invention and, together with the description, serve to explain the principles of the invention.

EXPLANATION OF REFERENCE NUMERALS

1100 . . . memory controller
1200, 1210, 1220 . . . system bus interface
1300 . . . memory controller core unit
1310 . . . intra-controller system bus
1320 . . . command controller
1400, 1410, 1420 . . . memory interface

BEST MODE FOR CARRYING OUT THE INVENTION

The best mode for carrying out the present invention will be explained below with reference to the accompanying drawings.

First Embodiment

Figure 1:
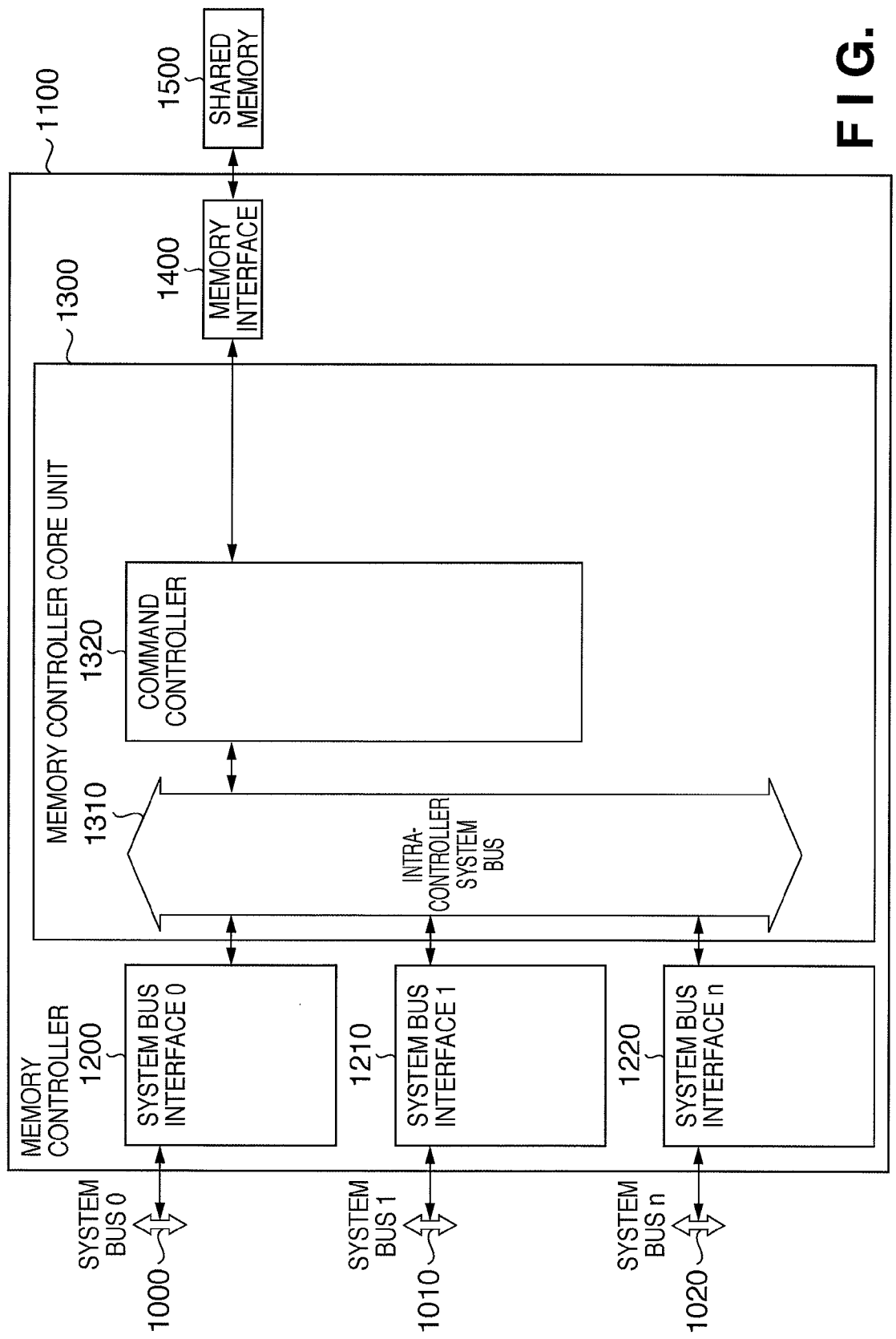
FIG. 1 is block diagram showing a memory controller according to the first embodiment.

FIG. 1 is a block diagram of a computer incorporating a memory controller according to the first embodiment.

Referring to FIG. 1, a memory controller 1100 is connected to system buses 1000, 1010, and 1020 via system bus interfaces (bus interface units) 1200, 1210, and 1220, respectively. As the system buses 1000, 1010, and 1020, it is possible to use buses complying with, for example, the AMBA (Advanced Microcontroller Bus Architecture) standards and AHB (Advanced High-performance Bus) standards.

Each of the system buses 1000, 1010, and 1020 is used as a transfer path of an access request command from a corresponding bus master (not shown) such as a processor and access data obtained by the command.

The memory controller 1100 has a memory controller core unit 1300. The memory controller core unit 1300 has a command controller 1320. The command controller 1320 is connected to the system bus interfaces 1200, 1210, and 1220 via an intra-controller system bus 1310. The intra-controller system bus 1310 exchanges commands between the command controller 1320 and the system bus interfaces 1200, 1210, and 1220.

Also, the command controller 1320 is connected to a shared memory 1500 via a memory interface (memory interface unit) 1400. As the shared memory 1500, it is possible to use, for example, a synchronous DRAM, DDR-SDRAM, or ROM.

In this configuration, the memory controller 1100 controls access to the shared memory 1500 in accordance with access requests from the system buses 1000, 1010, and 1020 by using the command controller 1320 as a core.

That is, when the bus master corresponding to the system bus 1000 requests access, a bus transaction request corresponding to the protocol of the system bus 1000 is transmitted to the corresponding system bus interface 1200. Similarly, when the bus masters corresponding to the system buses 1010 and 1020 request access, bus transaction requests corresponding to the protocols of these system buses are transmitted to the corresponding system bus interfaces 1210 and 1220.

The system bus interfaces 1200, 1210, and 1220 each convert the received transaction request into a protocol receivable by the intra-controller system bus 1310. Then, the system bus interfaces 1200, 1210, and 1220 each issue the transaction request command having undergone protocol conversion to the memory controller core unit 1300.

The command controller 1320 in the memory controller core unit 1300 receives this transaction request command via the intra-controller system bus 1310. The command controller 1320 performs command conversion such as address conversion on the received transaction request command. Then, the command controller 1320 issues the transaction request command having undergone command conversion such as address conversion to the memory interface 1400.

The memory interface 1400 performs protocol conversion on the transaction request command received from the command controller 1320, and issues an access command to the shared memory 1500.

In the first embodiment as explained above, the memory controller 1100 is divided into three portions. That is, the memory controller 1100 is divided into the system bus interfaces 1200, 1210, and 1220, the memory controller core unit 1300, and the memory interface 1400. Also, the memory controller core unit 1300 has the intra-controller system bus 1310 for the system bus interfaces, in addition to the command controller 1320.

Accordingly, the system bus interfaces 1200, 1210, and 1220 can be replaced in accordance with the specifications of the system buses 1000, 1010, and 1020. In addition, this embodiment is applicable to various systems by replacing the memory interface 1400 in accordance with the specifications of the shared memory 1500 to be connected.

In other words, it is possible to construct systems having different system bus configurations or to use shared memories having different specifications without changing (redesigning) the memory controller core unit 1300.

Second Embodiment

Figure 2:
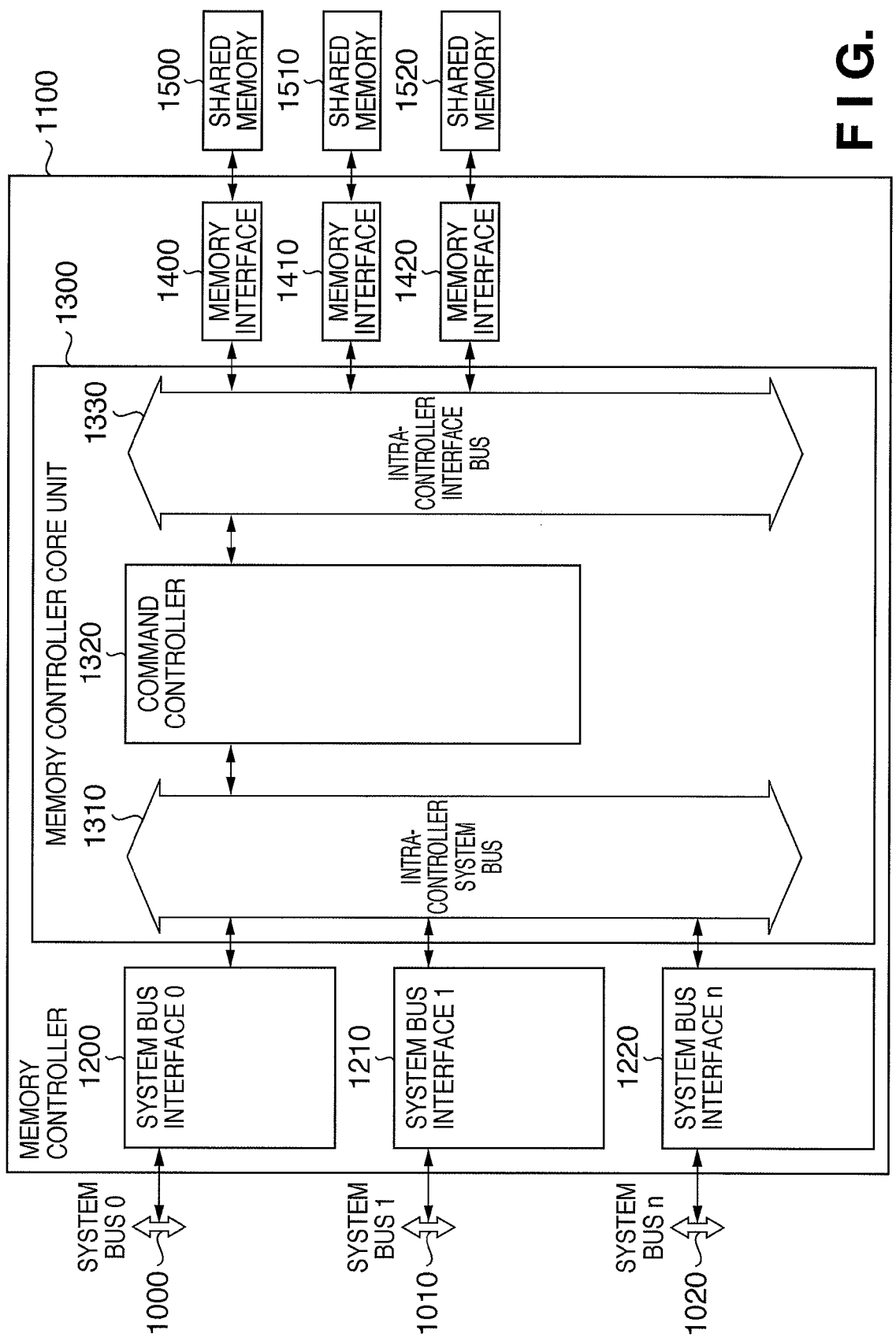
FIG. 2 is block diagram showing a memory controller according to the second embodiment.

FIG. 2 is a block diagram of a memory controller according to the second embodiment. The same reference numerals as in FIG. 1 denote the same parts, and different features will be mainly explained. Note that in the third to eighth embodiments to be described later, the same reference numerals as in FIG. 1 denote the same parts, and different features will be mainly explained.

In the second embodiment as shown in FIG. 2, an intra-controller interface bus 1330 is additionally formed on the shared memory side in order to control a plurality of shared memories 1500, 1510, and 1520. Also, memory interfaces 1400, 1410, and 1420 respectively corresponding to the shared memories 1500, 1510, and 1520 are formed.

In this configuration, a command controller 1320 controls access to the shared memories 1500, 1510, and 1520 via the intra-controller interface bus 1330.

In the second embodiment as described above, the intra-memory controller interface bus 1330 for the shared memories is formed in a memory controller core unit 1300. When increasing shared memories, therefore, the basic design of the memory controller core unit 1300 need not be changed, and it is only necessary to simply connect the memory interfaces 1400, 1410, and 1420 corresponding to the shared memories.

Third Embodiment

Figure 3:
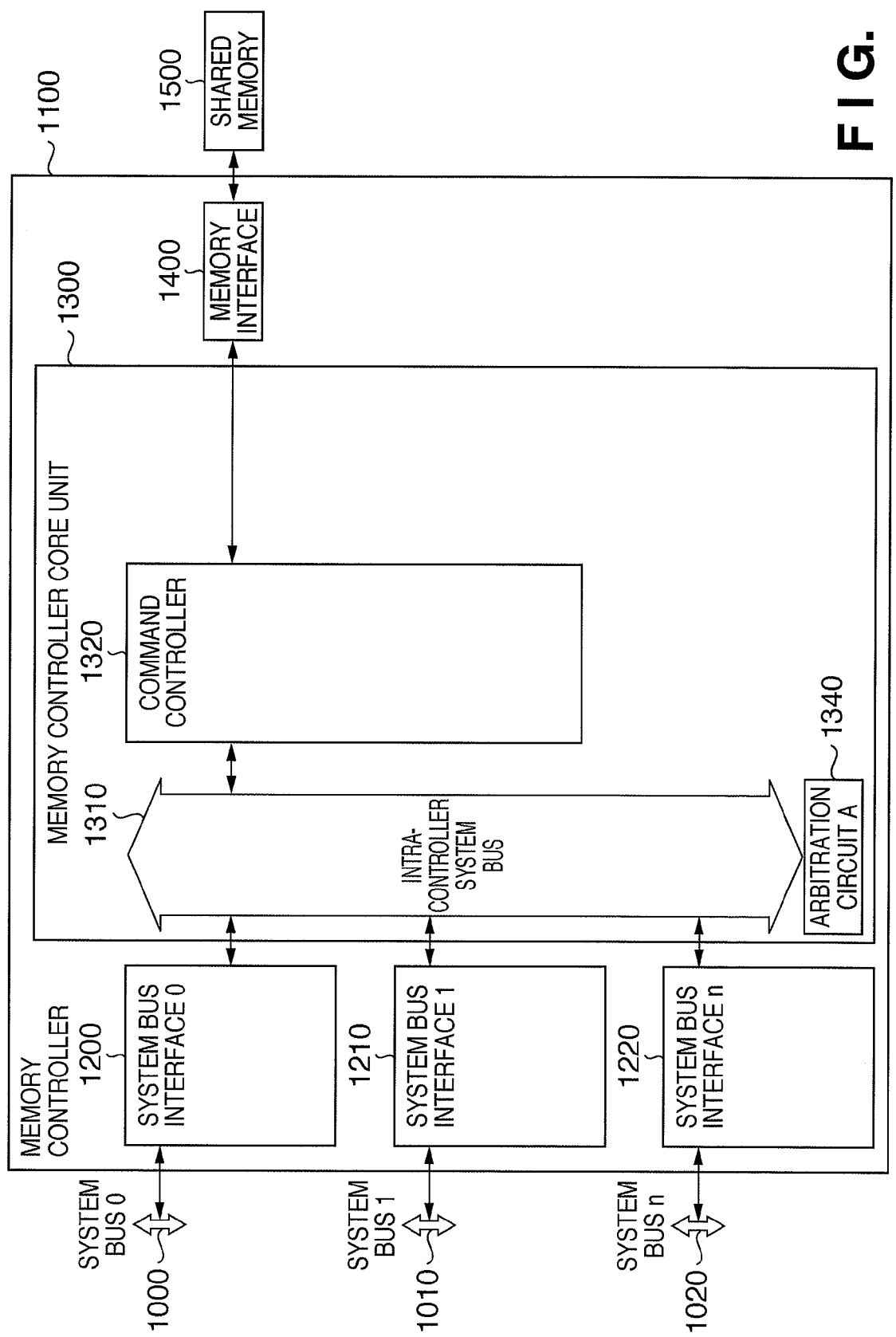
FIG. 3 is block diagram showing a memory controller according to the third embodiment.

FIG. 3 is a block diagram of a memory controller according to the third embodiment. In the third embodiment as shown in FIG. 3, an arbitration circuit A 1340 is added to an intra-memory controller system bus 1310.

When simultaneously receiving access request commands from bus masters, that is, system bus interfaces 1200, 1210, and 1220, the arbitration circuit A 1340 arbitrates the order of execution of these access request commands. That is, assume that the bus masters have simultaneously issued a plurality of access requests. In this case, the arbitration circuit A 1340 performs arbitration so as to execute the access request commands in accordance with priorities preset in the corresponding bus masters, that is, system buses 1000, 1010, and 1020.

For example, when the system bus 1000 is connected to a CPU and required to perform real-time processing compared to the system buses 1010 and 1020, the arbitration circuit A 1340 sets a highest priority for the system bus 1000. If an access request from the system bus 1000 competes with access requests from the system buses 1010 and 1020, the arbitration circuit A 1340 preferentially processes the access request from the system bus 1000.

In the third embodiment as described above, access can be controlled in accordance with a bus master while real-time processing is ensured, without changing the basic design of a memory controller core unit 1300.

Fourth Embodiment

Figure 4:
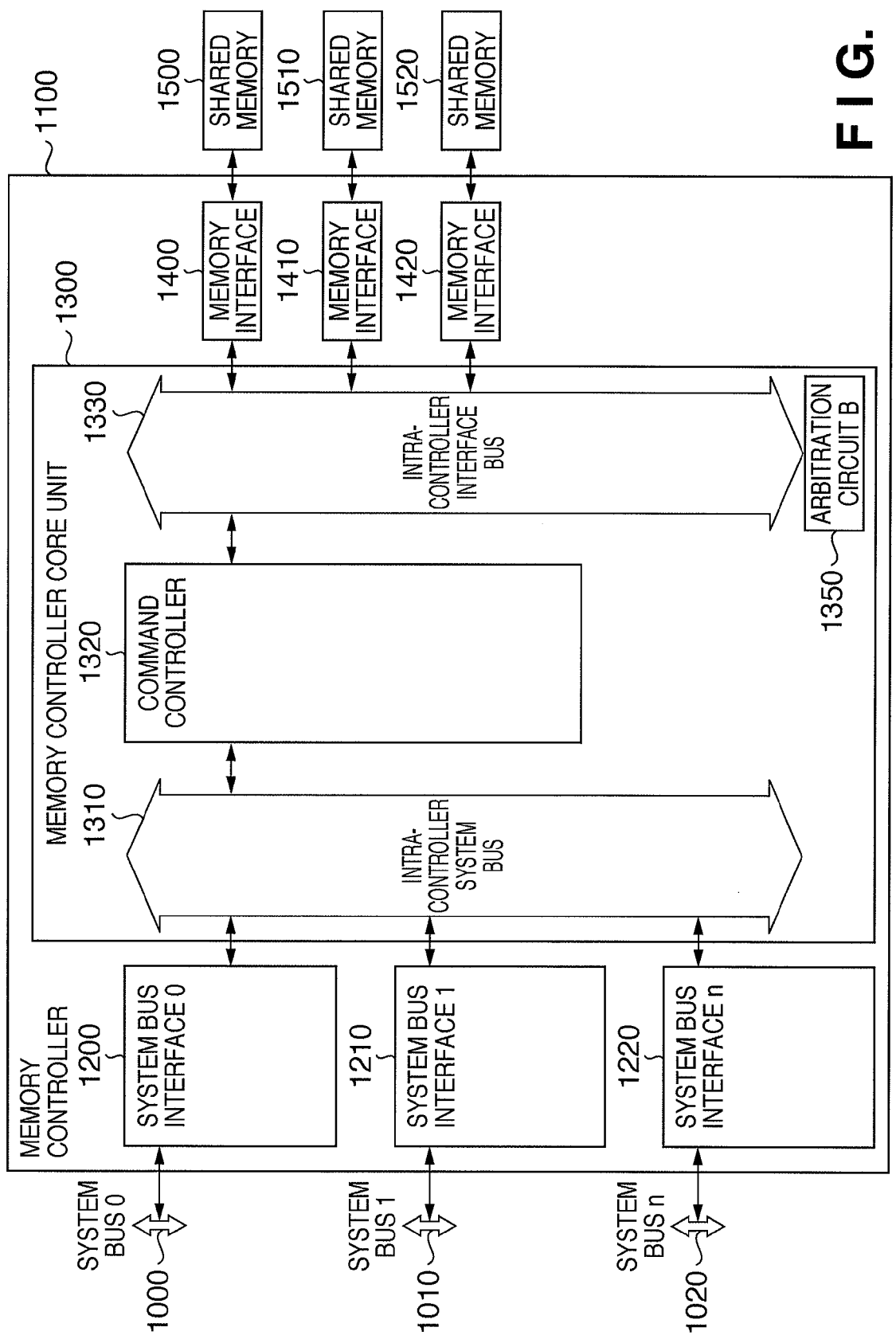
FIG. 4 is block diagram showing a memory controller according to the fourth embodiment.

FIG. 4 is a block diagram of a memory controller according to the fourth embodiment. In the fourth embodiment as shown in FIG. 4, an arbitration circuit B 1350 is added to an intra-controller interface bus 1330.

When simultaneously receiving readout data from shared memories 1500, 1510, and 1520 via memory interfaces 1400, 1410, and 1420, respectively, the arbitration circuit B 1350 arbitrates the order of data transfer. That is, assume that the intra-controller interface bus 1330 has received readout data from the memory interfaces 1400, 1410, and 1420 at the same time. In this case, the arbitration circuit B 1350 performs arbitration so as to transfer the readout data to system buses 1000, 1010, and 1020 in accordance with priorities present in the corresponding shared memories 1500, 1510, and 1520.

For example, for example, when the shared memory 1500 is an SDRAM and the shared memory 1510 is a ROM, a higher priority is set for the shared memory 1500. When simultaneously receiving readout data from the shared memories 1500 and 1510, the arbitration circuit B 1350 performs arbitration so as to preferentially transfer the readout data from the shared memory 1500 to the interface bus side.

Fifth Embodiment

Figure 5:
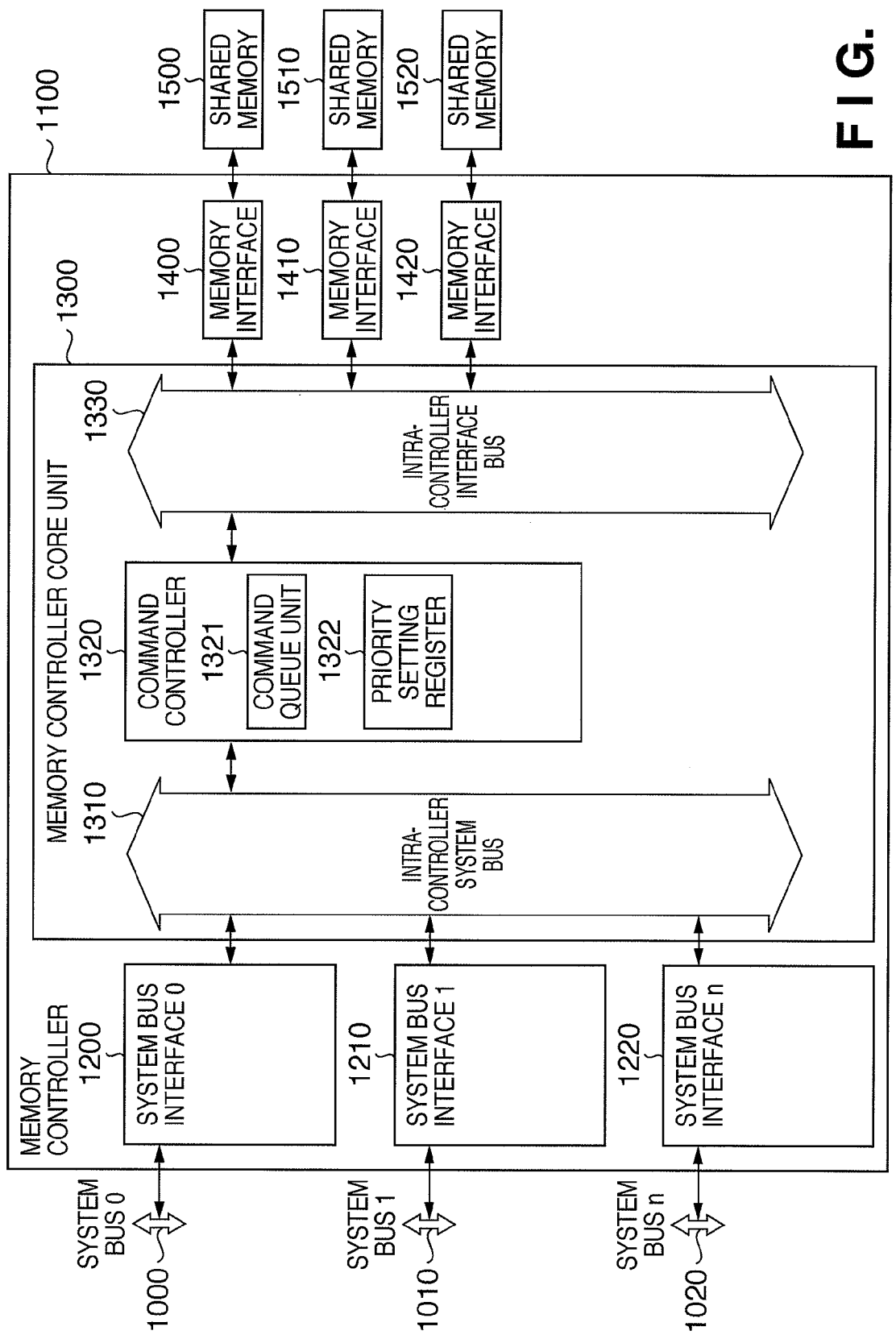
FIG. 5 is block diagram showing a memory controller according to the fifth embodiment.

FIG. 5 is a block diagram of a memory controller according to the fifth embodiment. In the fifth embodiment as shown in FIG. 5, a command controller 1320 has a command queue unit 1321 and priority setting register 1322.

The system bus priority setting register 1322 comprises registers for individually setting the priorities of system buses 1000, 1010, and 1020. Data indicating the priorities in association with the bus IDs of the system buses 1000, 1010, and 1020 are set in these registers.

Figure 6:
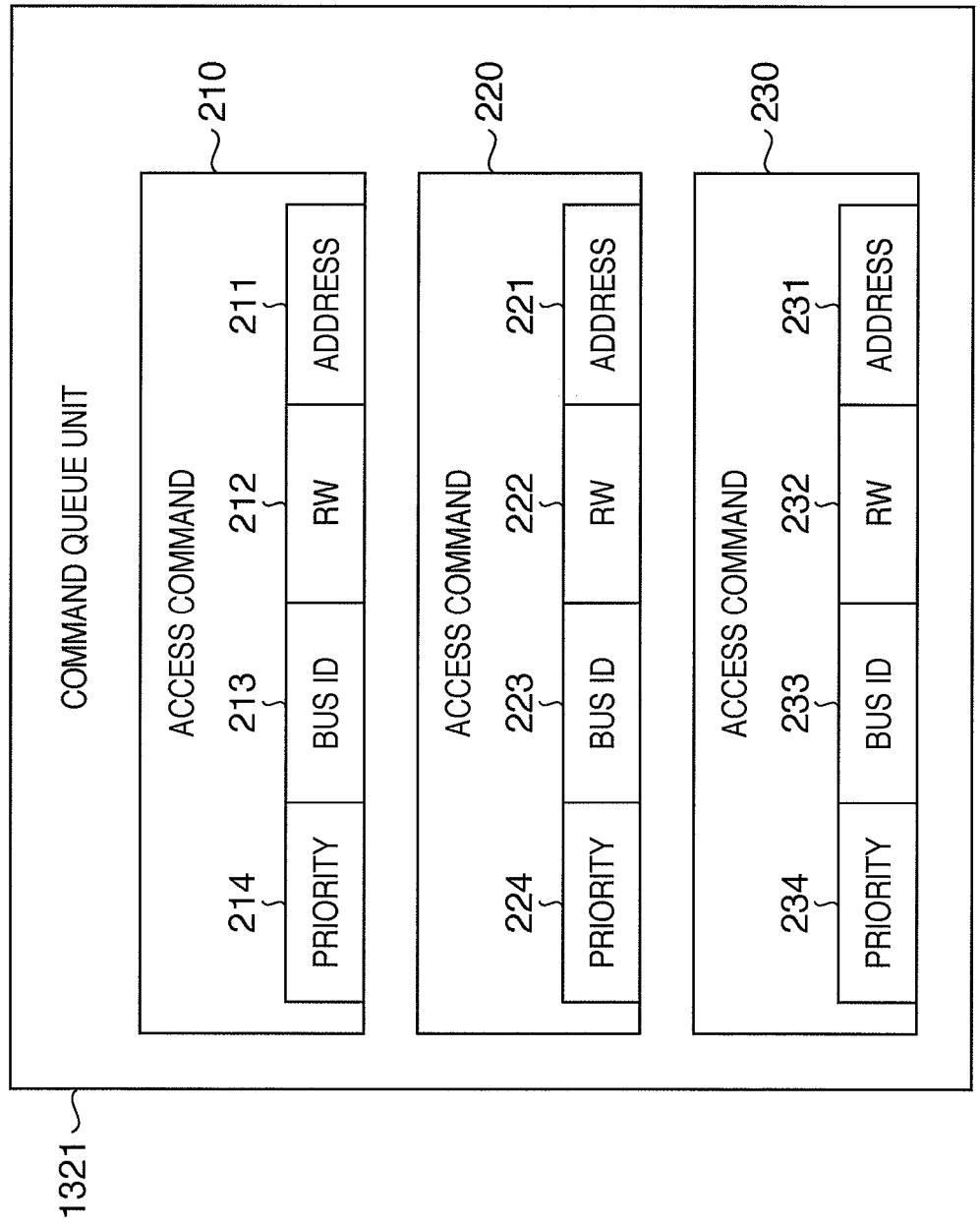
FIG. 6 is a view showing information of a command queue unit.

As shown in FIG. 6, a plurality of access commands 210, 220, and 230 are arranged in input order in the command queue unit 1321. The access commands 210, 220, and 230 respectively contain information of access addresses 211, 221, and 231 and flags 212, 222, and 232 each indicating read/write. Furthermore, the access commands 210, 220, and 230 respectively contain information of bus IDs 213, 223, and 233 and priorities 214, 224, and 234 of the system buses.

When any of the system buses 1000, 1010, and 1020 issues an access request in the configuration as described above, the command controller 1320 searches the priority setting register 1322 for the bus ID of the system bus having issued the access request. The command controller 1320 acquires priority information associated with the found bus ID, and determines the priority of the access request on the basis of the acquired priority information.

Then, the command controller 1320 compares the determined priority with the priorities of the access commands 210, 220, and 230 registered in the command queue unit 1321. If all the priorities of the already registered access commands are higher than the determined priority, the command controller 1320 newly registers the access command associated with the determined priority in the command queue unit 1321 such that the access command is executed last.

On the other hand, if even one access command having priority lower than the determined priority is registered, the command controller 1320 newly registers the access command associated with the request in the command queue unit 1321 so that the new and old access commands are executed in descending order of priority.

In the fifth embodiment, therefore, access can be controlled in accordance with a bus master while real-time processing is ensured, without changing the basic design of a memory controller core unit 1300.

Also, when increasing shared memories, the basic design of the memory controller core unit 1300 need not be changed, and it is only necessary to simply connect memory interfaces 1400, 1410, and 1420 corresponding to the shared memories, in the fifth embodiment as well.

Sixth Embodiment

Figure 7:
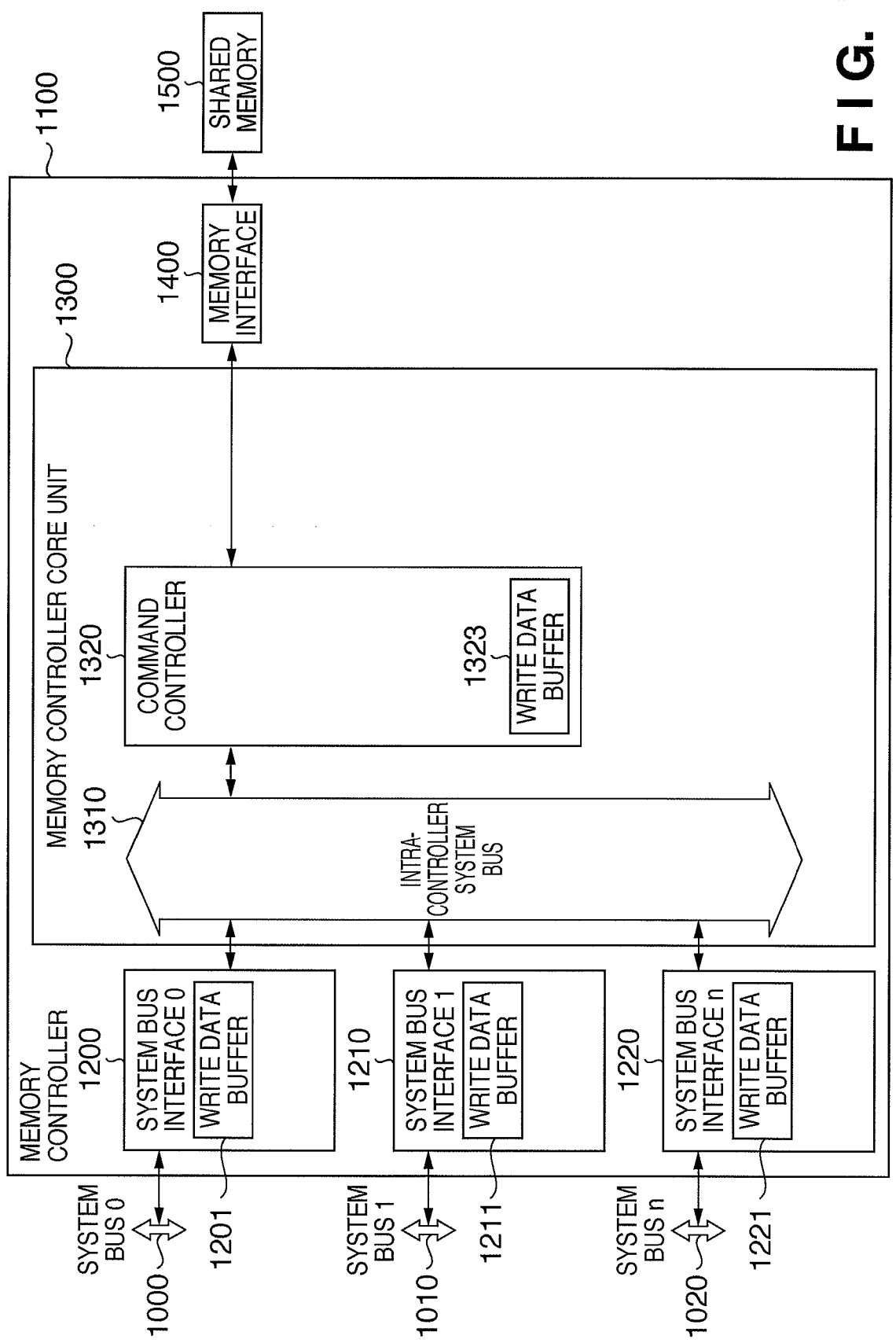
FIG. 7 is block diagram showing a memory controller according to the sixth embodiment.

FIG. 7 is a block diagram of a memory controller according to the sixth embodiment. In the sixth embodiment as shown in FIG. 7, a write data buffer 1323 is formed inside a command controller 1320.

In the sixth embodiment as described above, the size of a write data buffer of each system bus interface can be reduced because the write data buffer 1323 is formed inside the command controller 1320. This makes it possible to reduce the overhead when the number of system buses connected to a memory controller 1100 increases.

Seventh Embodiment

Figure 8:
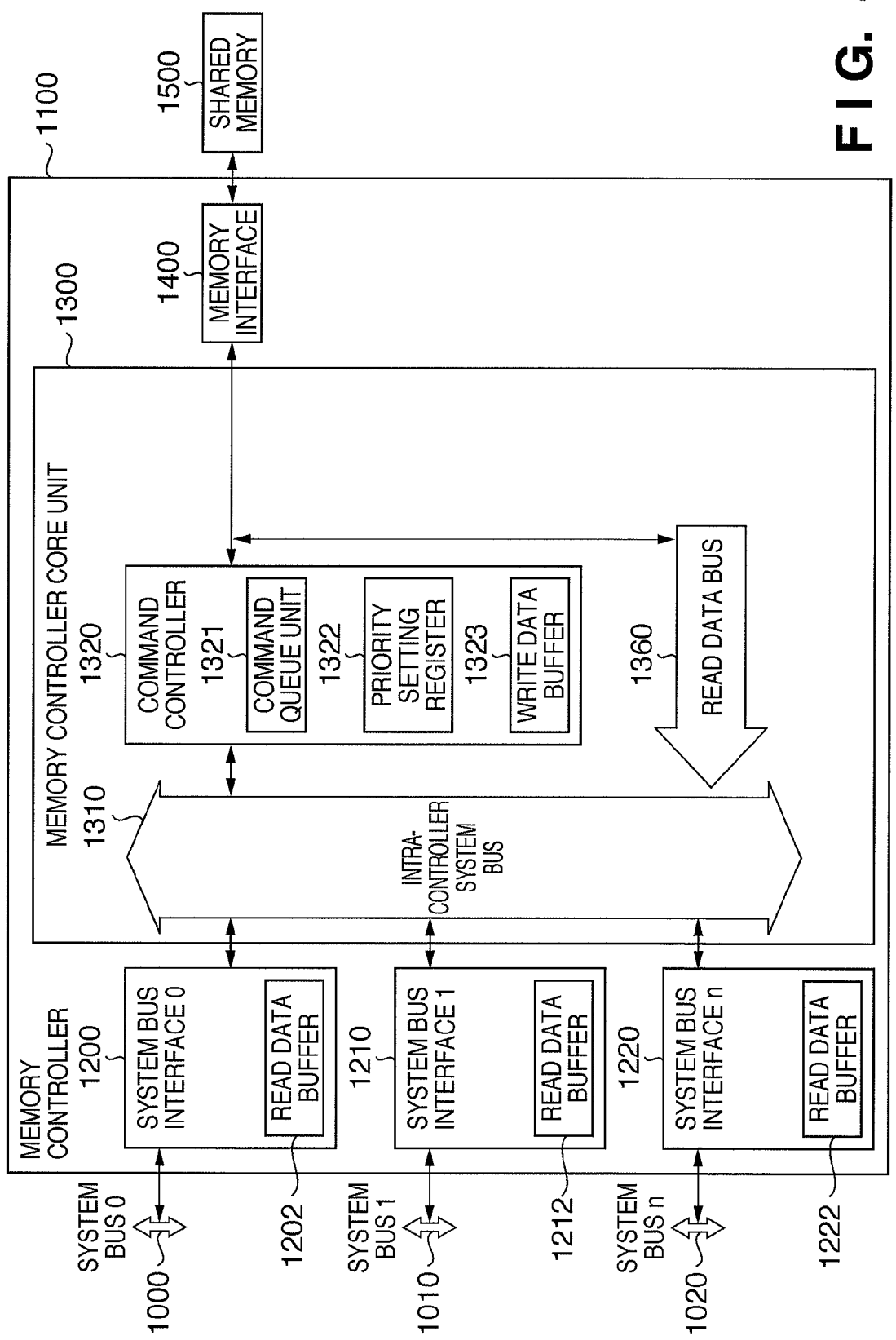
FIG. 8 is block diagram showing a memory controller according to the seventh embodiment.

FIG. 8 is a block diagram of a memory controller according to the seventh embodiment. In the seventh embodiment as shown in FIG. 8, a direct read data bus 1360 is formed in a memory controller core unit 1300. The direct read data bus 1360 is a bus for directly transferring read data from a memory interface 1400 to an intra-memory controller system bus 1310 without transferring the data via a command controller 1320.

Also, read data buffers 1202, 1212, and 1222 are respectively formed in system bus interfaces 1200, 1210, and 1220.

Accordingly, it is possible to achieve high-speed read by reducing the latency when reading out data from a shared memory 1500.

Note that the command controller 1320 includes a command queue unit 1321, priority setting register 1322, and write data buffer 1323 in FIG. 8, but these components may also be deleted. However, it is of course possible to obtain the above-mentioned effects of the command queue unit 1321, priority setting register 1322, and write data buffer 1323 if these constituent elements are installed.

Eighth Embodiment

Figure 9:
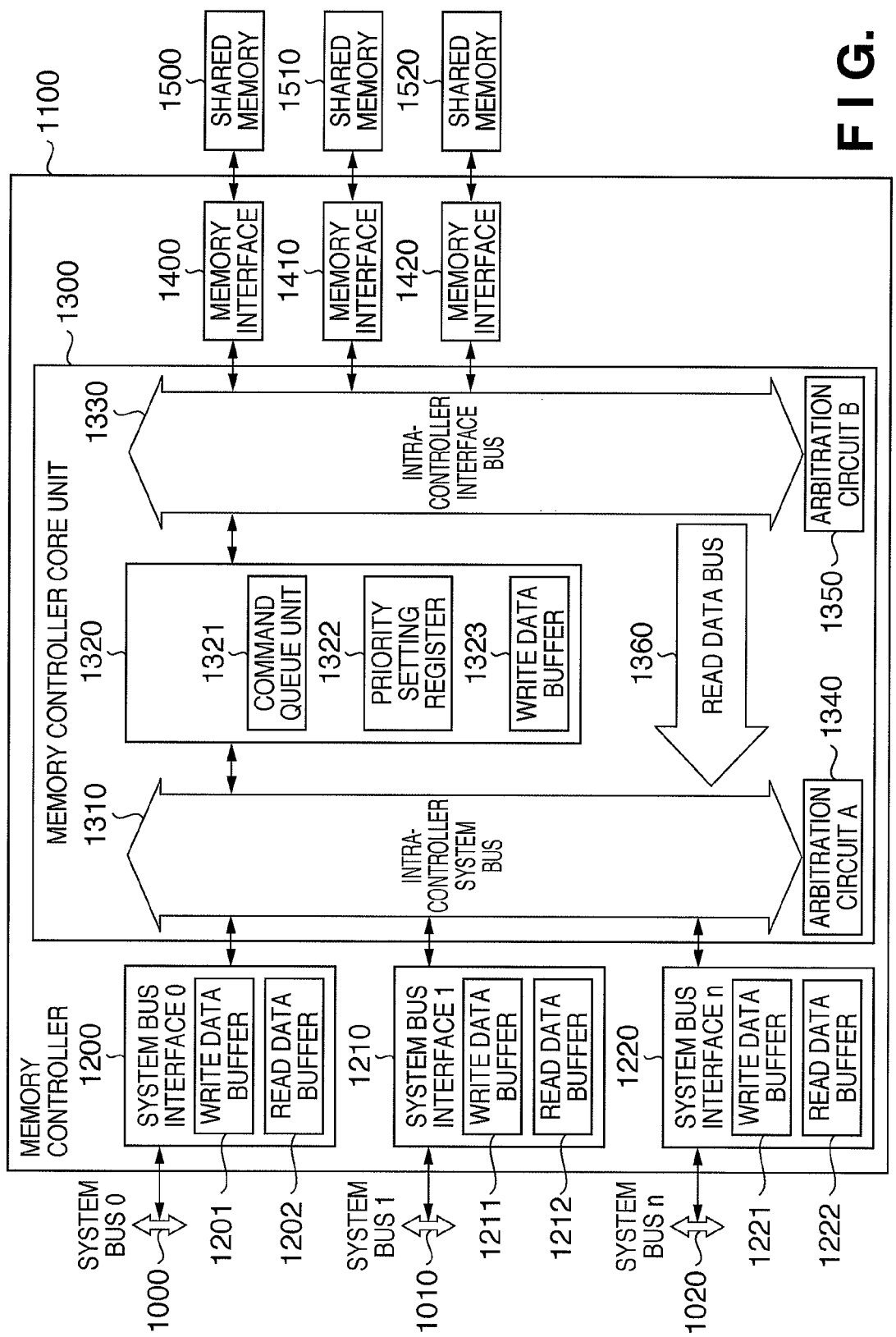
FIG. 9 is block diagram showing a memory controller according to the eighth embodiment.

FIG. 9 is a block diagram of a memory controller according to the eighth embodiment. As shown in FIG. 9, the eighth embodiment comprises an intra-memory controller interface bus 1330 and an arbitration circuit B 1350 connected to the intra-memory controller interface bus 1330, in addition to the elements forming the seventh embodiment shown in FIG. 8.

Also, in the eighth embodiment, an arbitration circuit A 1340 is connected to an intra-memory controller system bus 1310.

Accordingly, the eighth embodiment can achieve all the aforementioned effects according to the first to seventh embodiments.

The present invention is not limited to the above embodiments and various changes and modifications can be made without departing from the spirit and scope of the invention. Therefore, to apprise the public of the scope of the present invention, the following claims are appended.

This application claims the benefit of Japanese Patent Application No. 2006-199943, filed Jul. 21, 2006, which is hereby incorporated by reference herein in its entirety.

The invention claimed is:

1. A memory controller which controls a memory configured to be shared by a plurality of buses, comprising a plurality of bus interface units, a memory controller core unit, an internal bus and a memory interface unit, wherein said plurality of bus interface units receive commands from said plurality of buses, and convert the commands into commands receivable by said memory controller core unit via said internal bus, wherein said memory controller core unit includes a command controller which issues a received command to said memory interface unit, wherein said memory interface unit converts the received command from said memory controller core unit into a command corresponding to the memory, and wherein said internal bus exchanges commands between each of the plurality of bus interface units and said command controller, and wherein the memory controller further comprises a direct read data bus which transfers readout data from said memory interface unit to said internal bus without transferring the readout data via said command controller.

2. The memory controller according to claim 1, further comprising a second bus which exchanges commands between a plurality of memory interface units including said memory interface unit and said command controller.

3. The memory controller according to claim 1, further comprising an arbitration circuit which arbitrates the order of execution of access commands issued from said plurality of bus interface units.

4. The memory controller according to claim 2, further comprising an arbitration circuit which arbitrates the order of transfer of readout data received from said plurality of memory interface units.

5. The memory controller according to claim 1, wherein a queue for access commands issued from said plurality of bus interface units is controlled in accordance with priorities set in association with the access commands.

6. The memory controller according to claim 1, wherein said command controller includes a buffer which transfers write data from each of the plurality of bus interface units to said memory interface unit.

7. A computer incorporating a memory controller cited in claim 1.

8. A memory controller which controls a memory configured to be shared by a plurality of buses, comprising:
  a memory interface unit;
  a command controller which issues a received command to said memory interface unit;
  an internal bus;
  a plurality of bus interface units constructed to receive commands from said plurality of buses, and to convert the commands into commands receivable by said command controller via said internal bus; and
  a direct read data bus which transfers readout data from said memory interface unit to said internal bus without transferring the readout data via said command controller,
  wherein said memory interface unit converts the received command from said command controller into a command corresponding to the memory, and
  wherein said internal bus exchanges commands between each of the plurality of bus interface units and said command controller.

* * * * *